(12) United States Patent  (10) Patent No.: US 9,025,833 B2
Dudovich et al.  (45) Date of Patent: May 5, 2015

(54) SYSTEM AND METHOD FOR VIDEO-ASSISTED IDENTIFICATION OF MOBILE PHONE USERS

(75) Inventors: Boaz Dudovich, Rehovot (IL); Gideon Hazzani, Rishon le Zion (IL)

(73) Assignee: Verint Systems Ltd., Herzelia (IL)

( * ) Notice: Subject to any disclaimer, the term of this patent is extended or adjusted under 35 U.S.C. 154(b) by 103 days.

(21) Appl. No.: 13/189,514

(22) Filed: Jul. 24, 2011

(65) Prior Publication Data

US 2012/0051604 A1  Mar. 1, 2012

(30) Foreign Application Priority Data

Jul. 25, 2010 (IL) .......................................... 207176

(51) Int. Cl.
G06K 9/00 (2006.01)
(52) U.S. Cl.
CPC .................................. G06K 9/00771 (2013.01)
(58) Field of Classification Search
CPC .................................................. G06K 9/00778
See application file for complete search history.

(56) References Cited

U.S. PATENT DOCUMENTS

| | | | | | |
|---|---|---|---|---|---|
| 5,202,661 | A | * | 4/1993 | Everett et al. .................. | 340/522 |
| 7,873,638 | B2 | * | 1/2011 | Young et al. ................... | 707/736 |
| 8,189,866 | B1 | * | 5/2012 | Gu et al. ........................ | 382/103 |
| 8,258,945 | B2 | * | 9/2012 | Hazzani ......................... | 340/540 |
| 2003/0197612 | A1 | * | 10/2003 | Tanaka et al. ............... | 340/572.1 |
| 2004/0103289 | A1 | * | 5/2004 | Akama ........................... | 713/186 |
| 2004/0136388 | A1 | * | 7/2004 | Schaff ........................... | 370/401 |
| 2004/0161133 | A1 | * | 8/2004 | Elazar et al. .................. | 382/115 |
| 2005/0154637 | A1 | * | 7/2005 | Nair et al. ..................... | 705/14 |
| 2008/0133638 | A1 | * | 6/2008 | Fischer et al. ................ | 709/201 |
| 2009/0243844 | A1 | * | 10/2009 | Ishidera ......................... | 340/540 |
| 2009/0278946 | A1 | * | 11/2009 | Nath et al. .................... | 348/211.2 |
| 2010/0013633 | A1 | * | 1/2010 | Hazzani ......................... | 340/540 |
| 2010/0321463 | A1 | * | 12/2010 | Weinstein et al. ........... | 348/14.01 |
| 2011/0082915 | A1 | * | 4/2011 | Carr et al. ..................... | 709/219 |
| 2011/0134240 | A1 | * | 6/2011 | Anderson et al. ............ | 348/143 |

(Continued)

FOREIGN PATENT DOCUMENTS

WO  2010116292 A2  10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Tsung-Yin Tsai
(74) *Attorney, Agent, or Firm* — Meunier Carlin & Curfman

(57) ABSTRACT

Methods and systems for identifying and tracking individuals in a area-of-interest that may be covered by a video surveillance subsystem and by a communication location subsystem, and a correlation system correlates the outputs of the two subsystems. The communication location subsystem may monitor communication of mobile phones. The video subsystem captures video images of the area-of-interest, and processes the video images so as to identify individuals who are present in the area. The correlation system correlates a given mobile phone with a given individual who was identified by the video subsystem as being engaged in a phone conversation. After correlating the mobile phone with the individual using the phone, the correlation system outputs correlated information regarding the phone and its user to an operator.

18 Claims, 2 Drawing Sheets

(56) References Cited

U.S. PATENT DOCUMENTS

| | | | |
|---|---|---|---|
| 2011/0137845 A1* | 6/2011 | Ward | 706/50 |
| 2011/0256886 A1* | 10/2011 | Velusamy | 455/456.1 |
| 2011/0276396 A1* | 11/2011 | Rathod | 705/14.49 |
| 2012/0014558 A1* | 1/2012 | Stafford et al. | 382/103 |
| 2012/0079020 A1* | 3/2012 | Park et al. | 709/204 |
| 2012/0131047 A1* | 5/2012 | Rajaraman et al. | 707/769 |
| 2012/0215903 A1* | 8/2012 | Fleischman et al. | 709/224 |
| 2012/0323938 A1* | 12/2012 | Skeen et al. | 707/754 |
| 2012/0328190 A1* | 12/2012 | Bercovich et al. | 382/165 |
| 2013/0014158 A1* | 1/2013 | Bhatia et al. | 725/34 |
| 2013/0014223 A1* | 1/2013 | Bhatia et al. | 726/4 |
| 2013/0046826 A1* | 2/2013 | Stanton | 709/204 |
| 2013/0124653 A1* | 5/2013 | Vick et al. | 709/206 |
| 2013/0297694 A1* | 11/2013 | Ghosh | 709/204 |

OTHER PUBLICATIONS

Asokan, N., et al., "Man-in-the-Middle in Tunneled Authentication Protocols," Draft version 1.3 (latest public version: http://eprint.iacrorg/2002/163/, Nov. 11, 2002, 15 pages.

Vedaldi, Andrea, "An implementation of SIFT detector and descriptor," University of California at Los Angeles, 7 pages.

Girardin, Fabien, et al., "Detecting air travel to survey passengers on a worldwide scale," Journal of Location Based Services, 26 pages.

Meyer, Ulrike, et al., "On the Impact of GSM Encryption and Man-in-the-Middle Attacks on the Security of Interoperating GSM/UMTS Networks," IEEE, 2004, 8 pages.

* cited by examiner

SYSTEM AND METHOD FOR VIDEO-ASSISTED IDENTIFICATION OF MOBILE PHONE USERS

FIELD OF THE DISCLOSURE

The present disclosure relates generally to communication systems and video surveillance, and particularly to methods and systems for combined communication monitoring and video monitoring.

BACKGROUND OF THE DISCLOSURE

Mobile communication networks deploy various techniques for measuring the geographical locations of wireless communication terminals. Such techniques are used, for example, for providing emergency services (e.g., "911" or "112" services) in cellular networks. Video surveillance systems are deployed and operated in various applications, such as airport security, crime prevention and access control. In a typical video surveillance application, multiple video cameras acquire video footage, which is viewed and/or recorded at a monitoring center.

SUMMARY OF THE DISCLOSURE

An embodiment that is described herein provides a method, including:
identifying a mobile communication terminal that is active in an area under surveillance by monitoring communication conducted between the mobile communication terminal and a wireless communication network;
automatically identifying, in video images of the area, that an individual is engaged in a communication session; and
correlating the identified individual with the identified mobile communication terminal.

In some embodiments, identifying the individual includes applying to the video images an automated image recognition process, which recognizes a person holding a communication terminal. In an embodiment, identifying the mobile communication terminal includes detecting a first time at which the mobile communication terminal initiates the communication, identifying the individual includes detecting a second time at which the individual initiates the communication session, and correlating the individual with the mobile communication terminal includes correlating the first and second times. Detecting the second time may include applying to the video images an automated image recognition process, which recognizes a person initiating the communication.

In a disclosed embodiment, identifying the mobile communication terminal includes extracting information regarding the mobile communication terminal from the monitored communication, identifying the individual includes extracting one or more images of the individual from the video images, and correlating the individual with the mobile communication terminal includes correlating the information regarding the mobile communication terminal with the images of the individual. In an embodiment, the method includes presenting the information regarding the mobile communication terminal and the images of the individual to an operator. In another embodiment, extracting the information includes extracting at least one information type selected from a group of types consisting of a telephone number and an International Mobile Station Identity (IMSI) of the mobile communication terminal. In yet another embodiment, identifying the individual further includes matching the extracted images of the individual with at least one image drawn from a list of known individuals, and correlating the individual with the mobile communication terminal includes correlating the mobile communication terminal with the matching image drawn from the list.

In some embodiments, identifying the mobile communication terminal includes interrogating the mobile communication terminal by an interrogation device that is separate from the wireless communication network. In a disclosed embodiment, a coverage area of the interrogation device is aligned with a field-of-view of a video camera that captures the video images. In an alternative embodiment, identifying the mobile communication terminal includes accepting an identification of the mobile communication terminal from the wireless communication network. In an embodiment, identifying the mobile communication terminal includes retrieving an image of a subscriber of the identified mobile communication terminal, and the method includes matching a given individual who appears in the video images with the image of the subscriber of the identified mobile communication terminal.

There is additionally provided, in accordance with an embodiment that is described herein, apparatus, including:
a communication location subsystem, which is configured to identify a mobile communication terminal that is active in an area under surveillance by monitoring communication conducted between the mobile communication terminal and a wireless communication network;
a video subsystem, which is configured to identify, in video images of the area, that an individual is engaged in a communication session; and
a correlation processor, which is configured to correlate the individual with the identified mobile communication terminal.

There is also provided, in accordance with an embodiment that is described herein, apparatus, including:
a first interface, which is configured to accept an identification of a mobile communication terminal that is active in an area under surveillance, wherein the identification is obtained by monitoring communication conducted between the mobile communication terminal and a wireless communication network;
a second interface, which is configured to accept video images of the area; and
a processor, which is configured to identify in the video images of the area that an individual is engaged in a communication session, and to correlate the individual with the identified mobile communication terminal.

There is further provided, in accordance with an embodiment that is described herein, a computer software product, the product including a computer-readable medium, in which program instructions are stored, which instructions, when read by one or more processors, cause the processors to accept an identification of a mobile communication terminal that is active in an area under surveillance, wherein the identification is obtained by monitoring communication conducted between the mobile communication terminal and a wireless communication network, to accept video images of the area, to identify in the video images of the area that an individual is engaged in a communication session, and to correlate the individual with the identified mobile communication terminal.

The present disclosure will be more fully understood from the following detailed description of the embodiments thereof, taken together with the drawings in which:

DETAILED DESCRIPTION OF EMBODIMENTS

OVERVIEW

Embodiments that are described herein provide improved methods and systems for identifying and tracking individuals in an area-of-interest, such as in an airport terminal or train station. In some embodiments, the area-of-interest is covered by a video surveillance subsystem and by a communication location subsystem, and a correlation system correlates the outputs of the two subsystems.

The communication location subsystem monitors communication of mobile phones (or other kinds of mobile communication terminals) in the area-of-interest, and identifies mobile phones that conduct calls in the area at a given time. In addition, the communication location subsystem may extract information regarding the identified mobile phones, such as phone number and/or International Mobile Station Identity (IMSI).

The video subsystem captures video images of the area-of-interest, and processes the video images so as to identify individuals who are present in the area. In particular, the video subsystem applies an image recognition process that automatically identifies individuals who are engaged in a phone conversation (or other communication session). For example, the image recognition process may recognize an image of an individual who holds a mobile phone near his head. In some embodiments, the video subsystem extracts images of the identified individuals' faces from the video images.

The correlation system correlates a given mobile phone, which was identified by the communication location subsystem, with a given individual who was identified by the video subsystem as being engaged in a phone conversation. In some embodiments, the communication location subsystem detects the time at which the given mobile phone initiated a call, the video subsystem detects the time at which the given individual placed the mobile phone next to his ear, and the correlation system correlates the occurrence times of these two events.

After correlating the mobile phone with the individual using the phone, the correlation system outputs correlated information regarding the phone and its user to an operator. For example, the correlation subsystem may provide the operator with the phone number and IMSI of the mobile phone (obtained using the communication location subsystem) together with still or video images of the phone user's face (obtained using the video subsystem). The correlation is based on actual recognition that the individual observed in the video images is engaged in a phone conversation. The correlation is therefore highly reliable, even in crowded environments such as airport terminals and train stations.

Using the disclosed techniques, the correlation system provides the operator with valuable information regarding individuals who are found in the area-of-interest. The correlated video-related and communication-related information enables the operator to better identify and act upon suspicious events with high speed and efficiency.

System Description

Figure 1:
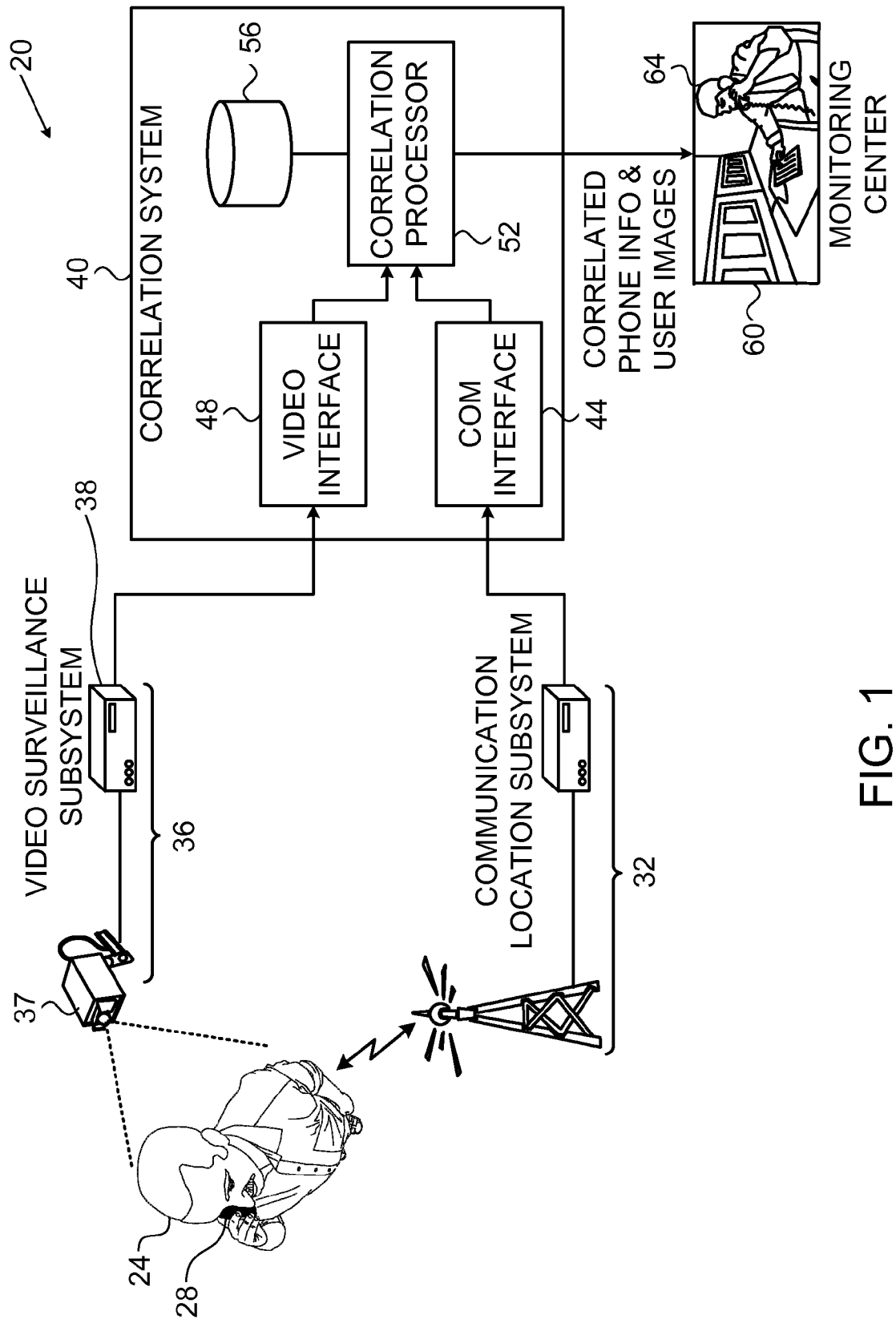
FIG. 1 is a block diagram that schematically illustrates a security monitoring system, in accordance with an embodiment of the present disclosure.

FIG. 1 is a block diagram that schematically illustrates a security monitoring system 20, in accordance with an embodiment of the present disclosure. System 20 monitors a certain area-of-interest, and in particular identifies individuals 24 who use mobile communication terminals 28, using a combination of video-based and communication-based monitoring. A system of this sort can be operated, for example, in an airport terminal or train station in order to identify potential terrorists or as part of a crime prevention system. Other example applications may cover any other suitable environment, such as a street or a football stadium.

System 20 comprises a communication location subsystem 32, which identifies mobile communication terminals that are active in the area-of-interest. Mobile communication terminals 28 may comprise, for example, cellular phones, wireless-enabled computers or Personal Digital Assistants (PDAs), or any other suitable communication or computing devices having wireless communication capabilities. A given terminal 28 communicates with a certain wireless communication network (not shown in the figure). The communication terminals may communicate with the network using any suitable communication standard or protocol, such as Global System for Mobile communication (GSM), Universal Mobile Telecommunication System (UMTS), CDMA2000 or other third generation (3G) cellular standard, Long Term Evolution (LTE) or Integrated Digital Enhanced Network (IDEN). Alternatively, the networks and terminals may conform to the IEEE 802.16 (WiMAX) standards or other wireless data standard. Although the description that follows refers to a single network, system 20 may identify terminals that operate with any desired number of networks, which may conform to different standards or protocols.

In some embodiments, communication location subsystem 32 comprises one or more interrogation devices (referred to as interrogators for brevity). A given interrogator establishes communication with mobile terminals 28 in a given coverage area, in order to extract identity attributes of the terminals. Each interrogator typically comprises a directional antenna, whose beam pattern (combined with the interrogator's transmission power) determines the coverage area. A typical interrogator imitates the operation of a base station, and solicits a mobile terminal to start communicating with the interrogator. The interrogator typically communicates with the terminal for a short period of time, during which it extracts the identity attributes of the terminal. For example, a given interrogator may force any terminal that enters its coverage area to perform a LOCATION UPDATE process, which reveals its identity.

A given interrogation device in subsystem 32 may extract various identity attributes of the terminal, such as, for example, the terminal's International Mobile Subscriber Identity (IMSI), the terminal's phone number or any other suitable attribute indicating the identity of the terminal. The above-described attribute extraction functions can be carried out using known Interrogation devices, which are sometimes referred to as "IMSI catchers." Examples of IMSI catching techniques are described, for example, by Strobel in "IMSI Catcher," Jul. 13, 2007, which is incorporated herein by reference, by Asokan et al., in "Man-in-the-Middle Attacks in Tunneled Authentication protocols," the 2003 Security Protocols Workshop, Cambridge, UK, Apr. 2-4, 2003, which is incorporated herein by reference, and by Meyer and Wetzel in "On the Impact of GSM Encryption and Man-in-the-Middle Attacks on the Security of Interoperating GSM/UMTS Networks," proceedings of the 15th IEEE International Symposium on Personal, Indoor and Mobile Radio Communications, Barcelona, Spain, Sep. 5-8, 2004, pages 2876-2883, which is incorporated herein by reference. Any of these known schemes, as well as any other suitable type of interrogator, can be used to implement the interrogation devices of subsystem 32. Typically, the interrogators are detached and separate from the communication network or networks via which terminals 28 communicate.

In alternative embodiments, communication location subsystem 32 is implemented as part of the communication network with which terminals 28 communicate. In these embodiments, subsystem 32 may apply any suitable location tracking technique available in the network, or a combination of such techniques, in order to measure terminal locations. Some location tracking techniques, referred to as network-based techniques, are carried out by base stations and/or other network-side components of the network, without necessarily using special hardware or software in terminals 28. Other location tracking techniques are terminal-based, i.e., use special hardware or software in mobile terminals 28. Some examples of location tracking techniques that can be used for this purpose are described in U.S. patent application Ser. No. 12/497,799, filed Jul. 6, 2009, whose disclosure is incorporated herein by reference. The location tracking techniques may be passive or active. Passive techniques perform unobtrusive probing of the signaling information transmitted in the network, and extract location information from the monitored signaling. Active techniques, on the other hand, proactively request the network or the terminal to provide location information. In either case, subsystem 32 is able to detect that a given terminal 28 is active in the area-of-interest, and to extract information regarding the terminal (e.g., phone number and/or IMSI) from the monitored communication.

System 20 further comprises a video surveillance subsystem 36, which captures video images of the area-of-interest. In a typical implementation, video subsystem 36 comprises one or more video cameras 37 that are connected to a video server 38. A given camera may have a fixed field-of-view, or it may comprise a Pan-Tilt-Zoom (PTZ) camera whose field-of-view is adjustable. In some embodiments, video server 38 applies an image recognition process that automatically identifies individuals who are engaged in a phone conversation, e.g., an individual who holds a mobile phone next to his head. As will be explained below, this identification is used to correlate mobile terminals identified by communication location subsystem 32 with individuals identified by video subsystem 36.

System 20 comprises a correlation system 40, which correlates the information produced by subsystems 32 and 36. Correlation system 40 comprises a communication interface 44, which is used for receiving location indications from communication location subsystem 32. In a typical embodiment, each location indication indicates that a given mobile terminal was identified in the area-of-interest. The location indication typically comprises a time stamp indicating the time at which the terminal in question was identified, and certain attributes of the terminal such as phone number and/or IMSI.

Correlation system 40 further comprises a video interface 48, which is used for receiving video images and additional information from video subsystem 36. The information obtained from subsystem 36 may comprise, for example, an indication that the video subsystem has identified in the video images an individual operating a mobile phone. The indication (referred to herein as "video indication") may also comprise additional information, such as a time stamp indicating the time at which the individual was observed. In some embodiments, the video subsystem extracts one or more (still or video) images of the individual, or of the individual's face, from the video images. The video subsystem may provide the extracted images to correlation system 40, as well.

Correlation system 40 comprises a correlation processor 52, which correlates the information obtained from subsystems 32 and 36. In particular, processor 52 finds correlations mobile phones, which were identified by communication location subsystem 32 as operating in the area-of-interest, with individuals who were identified by video subsystem 36 as being engaged in a phone conversation.

In a typical implementation, processor 52 receives location indications from communication location subsystem 32, each location indication indicating that a certain mobile terminal was identified as active in the area-of-interest at a given time. Processor 52 also receives video indications from video subsystem 36, each video indication indicating that a certain individual was identified in the video images as being engaged in a phone call at a given time. The video indications are typically accompanied with one or more images of the individual in question (typically the individual's face), as extracted from the video images.

Based on this information, processor 52 correlates a mobile terminal identified by subsystem 32 with an individual identified by subsystem 36. For example, processor 52 may correlate the indications of subsystem 32 and subsystem 36 using their respective time stamps. In other words, if subsystem 32 identified a communication terminal that was active in the area-of-interest at a certain time, and subsystem 36 identified that a certain individual was engaged in a phone conversation in the area-of-interest at approximately the same time, then processor 52 may conclude that the identified terminal is associated by the identified individual.

In some embodiments, the image recognition process applied by subsystem 36 is able to recognize the time at which an individual in question initiated the call. For example, subsystem 36 may identify the time at which the individual raised his arm and brought the mobile phone in proximity to his head. Subsystem 32, on the other hand, may be able to detect the time at which a mobile phone initiates a call. By correlating these two occurrence times, correlation processor 52 can correlate phones with individuals at high accuracy and with very low probability of error. This technique is especially useful in crowded environments and/or large areas-of-interest, wherein the area-of-interest comprises multiple individuals and/or multiple terminals. In alternative embodiments, processor 52 may correlate individuals with mobile phones using any other suitable technique.

Upon correlating a certain mobile terminal with a certain individual, processor 52 produces a correlated information set pertaining to the terminal and its user. This set typically comprises information obtained from both subsystem 32 and subsystem 36. In an example embodiment, the correlated information set comprises a telephone number and/or IMSI of the identified terminal (from subsystem 32) and an image of the individual's face (from subsystem 36). The correlated information set may also comprise video footage of the individual as captured by subsystem 36.

In some embodiments, processor 52 outputs the correlated information to a monitoring center 60, where an operator 64 views and acts upon the information. Additionally or alternatively, processor 52 stores the correlated information in a database 56, e.g., on a magnetic disk or other storage device. Processor 52 may also store video footage that, provided by subsystem 36, in database 52.

The configuration of FIG. 1 is an example configuration, which is chosen purely for the sake of conceptual clarity. In alternative embodiments, any other suitable system configuration can also be used. For example, the image recognition process that recognizes individuals who are engaged in phone conversations can be carried out by correlation processor 52 rather than by video subsystem 36. Although FIG. 1 shows a single terminal and a single individual for the sake of clarity, the disclosed techniques can also be used when the area-of-interest contains multiple mobile terminals and/or multiple individuals.

In a typical implementation, communication location subsystem 32 comprises a single interrogator, and video subsystem 36 comprises a single video camera. In this embodiment, the camera's field-of-view and the interrogator's coverage area are designed to cover approximately the same geographical area. For example, the camera and interrogator may be collocated and aligned. Alternatively, however, subsystems 32 and 36 may be deployed in any other suitable way. Typically, however, both subsystems are configured to cover approximately the same area-of-interest.

The elements of system 20 may be implemented in hardware, in software, or using a combination of hardware and software elements. In some embodiments, video server 38 and correlation processor 52 comprise general-purpose computers, which are programmed in software to carry out the functions described herein. The software may be downloaded to the computers in electronic form, over a network, for example, or it may, alternatively or additionally, be provided and/or stored on non-transitory tangible media, such as magnetic, optical, or electronic memory.

Security Monitoring Method Description

Figure 2:
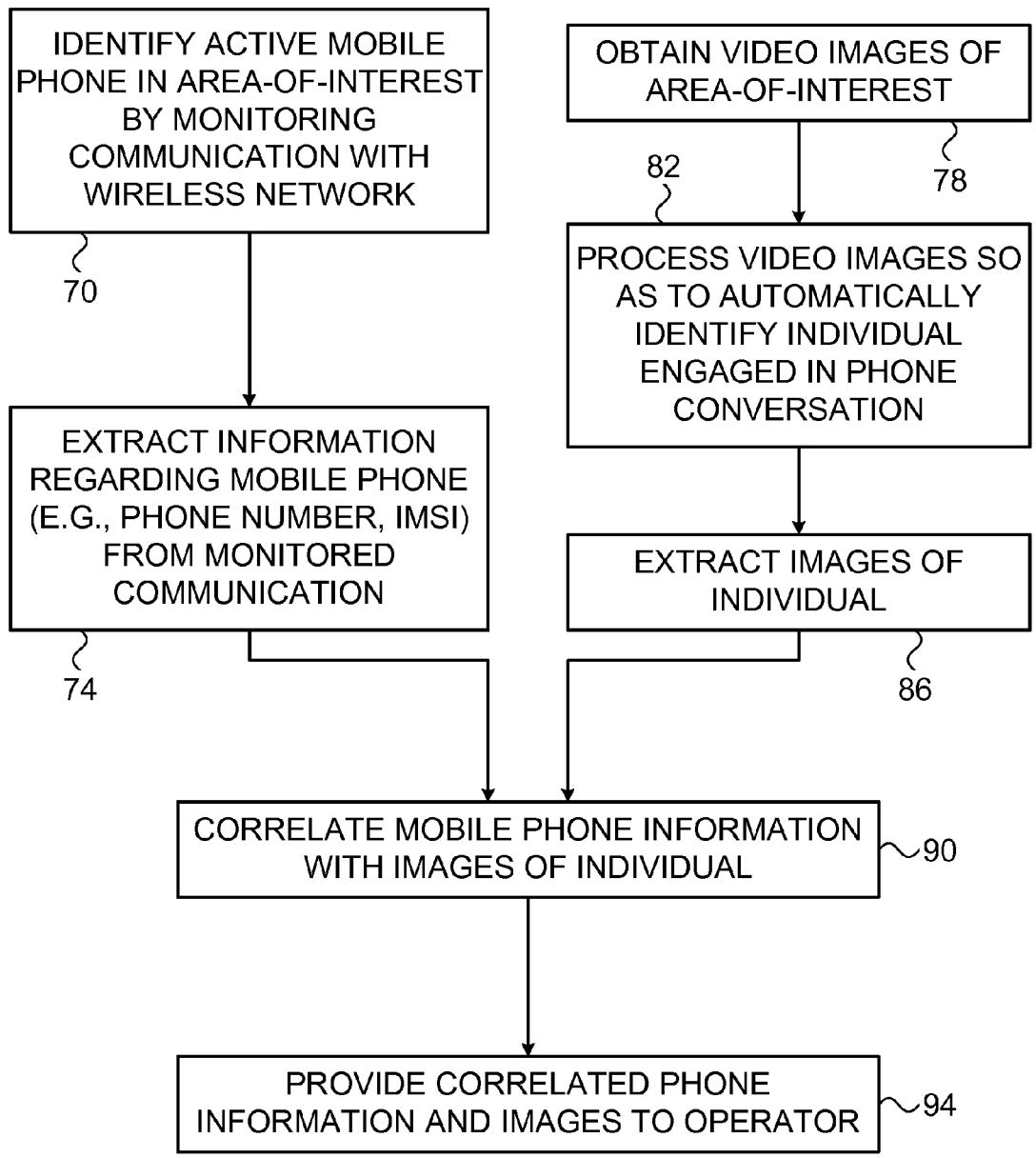
FIG. 2 is a flow chart that schematically illustrates a method for security monitoring, in accordance with an embodiment of the present disclosure.

FIG. 2 is a flow chart that schematically illustrates a method for security monitoring, in accordance with an embodiment of the present disclosure. The method begins with communication location subsystem 32 identifying one or more mobile communication terminals 28 that are active in a certain area-of-interest, at a terminal identification step 70. Subsystem 32 identifies the active terminals by monitoring the communication between terminals 28 and the wireless communication network. Subsystem 32 extracts information regarding the active terminals from the monitored communication, at a communication extraction step 74. Such information may comprise, for example, the phone number and/or IMSI of each active terminal.

In parallel, video subsystem 36 captures video images of the area-of-interest, at a video capturing step 78. Subsystem 36 processes the captured video, so as to identify one or more individuals that are engaged in a phone conversation, at an image recognition step 82. Example techniques that can be used for this purpose are described below. For each identified individual, the video subsystem extracts one or more images of the individual (e.g., of the individual's face) from the video images, at a video extraction step 86.

Correlation processor 52 correlates the information provided by subsystem 32 (information regarding identified active terminals) and by subsystem 36 (images of individuals identified as conducting phone calls), at a correlation step 90. As explained above, the correlation may use time stamps that are provided by subsystems 32 and 36. Correlation processor 52 provides the correlated information to monitoring center 60 for presenting to operator 64, at an output step 94. Processor 52 may also store the correlated information in database 56.

Video subsystem 36 (video server 38 in this example) may use any suitable image recognition process for automatically identifying individuals who are engaged in communication sessions. In an example process, server 38 uses an image model of an individual holding a phone, and another image model of an individual who does not hold a phone. Using these two models, server 38 distinguishes between an individual holding a phone and an individual who does not hold a phone in the video images.

An image models can be constructed, for example, by capturing multiple training images of individuals (typically images of the individuals' torsos), some holding phones and some who do not. Each training image is divided into blocks (e.g., 6-by-6 pixels each). A histogram of gradient angles is constructed for each block. (A gradient angle is typically defined as the rate of change in image color from pixel to pixel.) Typically, each gradient angle is weighted according to its magnitude. A set of 6×6×8=288 vectors represents the visual information of a person holding a phone as opposed to a person who does not hold a phone, and are used as input or "Descriptor." The above-described classifier is trained to distinguish between the two classes (between a person holding a phone and a person who does not hold a phone). Any suitable classifier, such as Support Vector Machines (SVM) or Neural Networks, can be used for this purpose. An example classification and training method is described by Vedaldi, in "An Implementation of SIFT Detector and Descriptor," University of California at Los Angeles, 2006, which is incorporated herein by reference. Alternatively, any other suitable scheme can also be used.

When a new image is provided to server 38 for analysis, the server first determines an image location where an image of an individual is expected to be located (e.g., based on motion, face detection, descriptors or any other suitable method). The server then applies the above-described classifier to this image location, in order to determine whether the image location contains an image of a person holding a phone or a person not holding a phone.

Although the embodiments described herein mainly address identification of individuals holding mobile phones, the principles of the present disclosure can also be used for identifying individuals that use other kinds of communication terminals and/or for conducting other kinds of communication sessions. For example, the disclosed techniques can be used to automatically identify users of mobile computing platforms (e.g. PDAs) who are in the process of communicating. As another example, the disclosed techniques can be used to automatically identify users who are in the process of sending Short Message Service (SMS) messages or e-mails using a mobile communication terminal, or users who communicate using a handheld radio ("walkie-talkie").

In some embodiments, additional information regarding the identified user, such as the user's car license plate number, can be extracted from the video images and combined with the other correlated information (e.g., IMSI and image of user). This information can also be presented to operator 64 by processor 52.

In some embodiments, system 20 may use the image of the identified individual's face to automate and improve the correlation process. In an example embodiment, system 20 may hold or have access to a blacklist of images of suspect individuals (e.g., a picture album of criminals or terrorists). Once an image of the individual operating the identified terminal is available, video server 38 can compare this image against the blacklist using any suitable face recognition method. If a match is found (i.e., if the image of the individual in question matches one of the images in the blacklist), correlation system 40 can correlate the blacklist entry (e.g., known criminal or terrorist) with the terminal (e.g., phone number or IMSI). Using this method, the operator is provided with the phone number or IMSI of a known target. This technique is useful, for example, for tracking criminals or terrorists that change phones or Subscriber Identity Module (SIM) cards.

In some embodiments, system 20 has access to subscriber records of the operator of the wireless communication network. Once the terminal is identified by location subsystem 32, system 20 (for example correlation processor 52) can obtain an image of the subscriber of that terminal from the network operator's subscriber records. Then, video server 38 can compare the subscriber's image to any individual that appears in the video images captured by video subsystem 36. Any suitable face recognition method can be used for this purpose. If a match is found, the operator is provided with an absolute identification of the individual. This technique does not rely on image processing to identify a person holding a phone. Moreover, this technique is highly reliable since the face recognition process looks for a match against a specific image—drawn from the subscriber records.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
identifying a mobile communication terminal that is active in an area under surveillance by monitoring communication conducted between the mobile communication terminal and a wireless communication network;
automatically identifying, in video images of the area, that an individual is engaged in a communication session using the mobile communication terminal, by using a comparison of a first image model of an individual holding a model mobile communication terminal and a second image model of an individual not holding the model mobile communication terminal, wherein image models are constructed by capturing multiple training images of individuals, wherein only a subset are holding phones near their head; and
correlating the identified individual with the identified mobile communication terminal;
wherein identifying the mobile communication terminal comprises extracting information regarding the mobile communication terminal from the monitored communication,
wherein identifying the individual comprises extracting one or more images of the individual from the video images, and
wherein correlating the individual with the mobile communication terminal comprises correlating the information regarding the mobile communication terminal with the images of the individual.

2. The method according to claim 1, wherein identifying the individual comprises applying to the video images an automated image recognition process, which recognizes a person holding a communication terminal.

3. The method according to claim 1, wherein identifying the mobile communication terminal comprises detecting a first time at which the mobile communication terminal initiates the communication, wherein identifying the individual comprises detecting a second time at which the individual initiates the communication session, and wherein correlating the individual with the mobile communication terminal comprises correlating the first and second times.

4. The method according to claim 3, wherein detecting the second time comprises applying to the video images an automated image recognition process, which recognizes a person initiating the communication.

5. The method according to claim 1, and comprising presenting the information regarding the mobile communication terminal and the images of the individual to an operator.

6. The method according to claim 1, wherein extracting the information comprises extracting at least one information type selected from a group of types consisting of a telephone number and an International Mobile Station Identity (IMSI) of the mobile communication terminal.

7. The method according to claim 1, wherein identifying the individual further comprises matching the extracted images of the individual with at least one image drawn from a list of known individuals, and wherein correlating the individual with the mobile communication terminal comprises correlating the mobile communication terminal with the matching image drawn from the list.

8. The method according to claim 1, wherein identifying the mobile communication terminal comprises interrogating the mobile communication terminal by an interrogation device that is separate from the wireless communication network.

9. The method according to claim 8, wherein a coverage area of the interrogation device is aligned with a field-of-view of a video camera that captures the video images.

10. The method according to claim 1, wherein identifying the mobile communication terminal comprises accepting an identification of the mobile communication terminal from the wireless communication network.

11. The method according to claim 1, wherein identifying the mobile communication terminal further comprises retrieving an image of a subscriber of the identified mobile communication terminal, and comprising matching a given individual who appears in the video images with the image of the subscriber of the identified mobile communication terminal.

12. Apparatus, comprising:
a communication location subsystem, which is configured to identify a mobile communication terminal that is active in an area under surveillance by monitoring communication conducted between the mobile communication terminal and a wireless communication network;
a video subsystem, which is configured to identify, in video images of the area, that an individual is engaged in a communication session using a comparison of a first image model of an individual holding a model mobile communication terminal and a second image model of an individual not holding the model mobile communication terminal, wherein image models are constructed by capturing multiple training images of individuals, wherein only a subset are holding phones near their head; and
a correlation processor, which is configured to correlate the individual with the identified mobile communication terminal;
wherein the communication location subsystem is configured to extract information regarding the mobile communication terminal from the monitored communication,
wherein the video subsystem is configured to extract one or more images of the individual from the video images, and
wherein the correlation processor is configured to correlate the information regarding the mobile communication terminal with the images of the individual.

13. The apparatus according to claim 12, wherein the video subsystem is configured to identify the individual by applying to the video images an automated image recognition process, which recognizes a person holding a communication terminal.

14. The apparatus according to claim 12, wherein the communication location subsystem is configured to detect a first time at which the mobile communication terminal initiates the communication, wherein the video subsystem is configured to detect a second time at which the individual initiates the communication session, wherein the correlation processor is configured to correlate the first and second times.

15. The apparatus according to claim 14, wherein the video subsystem is configured to detect the second time by applying to the video images an automated image recognition process, which recognizes a person initiating the communication.

16. The apparatus according to claim 12, wherein the correlation processor is configured to output the information regarding the mobile communication terminal and the images of the individual for presentation to an operator.

17. The apparatus according to claim 12, wherein the communication location subsystem is configured to extract at least one information type selected from a group of types consisting of a telephone number and an International Mobile Station Identity (IMSI) of the mobile communication terminal.

18. A non-transitory computer-readable medium, in which program instructions are stored, which instructions, when read by one or more processors, cause the processors to accept an identification of a mobile communication terminal that is active in an area under surveillance, wherein the identification is obtained by monitoring communication conducted between the mobile communication terminal and a wireless communication network, to accept video images of the area, to identify in the video images of the area that an individual is engaged in a communication session using a comparison of a first image model of an individual holding a model mobile communication terminal and a second image model of an individual not holding the model mobile communication terminal, wherein image models are constructed by capturing multiple training images of individuals, wherein only a subset are holding phones near their head, and to correlate the individual with the identified mobile communication terminal;
    wherein the communication location subsystem is configured to extract information regarding the mobile communication terminal from the monitored communication,
    wherein the video subsystem is configured to extract one or more images of the individual from the video images, and
    wherein the correlation processor is configured to correlate the information regarding the mobile communication terminal with the images of the individual.

* * * * *